United States Patent
Erez et al.

(10) Patent No.: US 10,606,760 B2
(45) Date of Patent: Mar. 31, 2020

(54) NONVOLATILE MEMORY DEVICES AND METHODS OF CONTROLLING THE SAME

(71) Applicant: SAMSUNG ELECTRONICS CO., LTD., Suwon-si, Gyeonggi-Do (KR)

(72) Inventors: Elona Erez, Ramat-Gan (IL); Avner Dor, Ramat-Gan (IL); Moshe Twitto, Ramat-Gan (IL); Jun Jin Kong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 75 days.

(21) Appl. No.: 15/684,252

(22) Filed: Aug. 23, 2017

(65) Prior Publication Data
US 2019/0065392 A1 Feb. 28, 2019

(51) Int. Cl.
*G06F 12/1009* (2016.01)
*G06F 12/02* (2006.01)

(52) U.S. Cl.
CPC ...... *G06F 12/1009* (2013.01); *G06F 12/0238* (2013.01); *G06F 12/0246* (2013.01); *G06F 2212/2022* (2013.01); *G06F 2212/401* (2013.01); *G06F 2212/7201* (2013.01)

(58) Field of Classification Search
CPC ............. G06F 12/1009; G06F 12/0238; G06F 2212/2022; G06F 2212/7201
See application file for complete search history.

(56) References Cited

U.S. PATENT DOCUMENTS

| | | | |
|---|---|---|---|
| 6,674,441 B1 * | 1/2004 | Frank | G06F 12/1027 345/503 |
| 7,529,880 B2 | 5/2009 | Chung et al. | |
| 8,086,585 B1 * | 12/2011 | Brashers | G06F 16/137 707/705 |
| 8,392,690 B2 | 3/2013 | Chu et al. | |
| 8,843,711 B1 * | 9/2014 | Yadav | G06F 3/0608 711/154 |
| 9,043,536 B2 | 5/2015 | Ho et al. | |
| 9,495,288 B2 | 11/2016 | Cohen | |
| 9,514,057 B2 | 12/2016 | Marcu et al. | |
| 2008/0010432 A1 * | 1/2008 | Kasuya | G06F 9/4843 711/202 |

(Continued)

FOREIGN PATENT DOCUMENTS

JP 2016-085541 5/2016
KR 10-1226600 1/2013

*Primary Examiner* — Nanci N Wong
(74) *Attorney, Agent, or Firm* — F. Chau & Associates, LLC

(57) ABSTRACT

A memory system includes a nonvolatile memory device having a plurality of physical sectors, a mapping table, and a memory controller including a plurality of hash functions. The memory controller is configured to access the physical sectors using the mapping table and the hash functions. The memory controller is configured to receive a sequence of logical block addresses (LBAs) from a host and logical sector data for each of the LBAs, generate a first virtual address by operating a selected hash function among the hash functions on a first logical block address (LBA) among the sequence, compress the logical sector data to generate compressed data, and store the compressed data in a first physical sector among the physical sectors that is associated with the first virtual address.

18 Claims, 10 Drawing Sheets

(56) References Cited

U.S. PATENT DOCUMENTS

| | | | |
|---|---|---|---|
| 2010/0100667 A1 | 4/2010 | Kang et al. | |
| 2010/0115210 A1* | 5/2010 | Wicklund | G06F 3/0617 711/154 |
| 2011/0106804 A1* | 5/2011 | Keeler | G06F 3/061 707/737 |
| 2012/0102295 A1* | 4/2012 | Yang | G06F 12/023 711/206 |
| 2012/0102298 A1 | 4/2012 | Sengupta et al. | |
| 2012/0159071 A1* | 6/2012 | Kamon | G06F 3/0605 711/118 |
| 2013/0246721 A1* | 9/2013 | Fukutomi | G06F 3/0604 711/155 |
| 2014/0068182 A1* | 3/2014 | Terry | G06F 3/0617 711/114 |
| 2015/0081961 A1* | 3/2015 | Kwon | G11C 16/10 711/103 |
| 2015/0106557 A1* | 4/2015 | Yu | G11C 16/3431 711/103 |
| 2016/0335195 A1* | 11/2016 | Kawamura | G06F 12/0246 |
| 2017/0004069 A1* | 1/2017 | Li | G06F 12/08 |
| 2017/0220256 A1* | 8/2017 | Balasubramonian | G06F 12/0238 |
| 2017/0300592 A1* | 10/2017 | Breslow | G06F 16/9014 |

\* cited by examiner

| LBA | Index of Hash Leader | Pointer to Leader |
|---|---|---|
| 100 | 17 | 0 |
| 101 | 17 | 1 |
| 102 | 17 | 2 |
| 103 | 17 | 3 |
| 104 | 17 | 4 |

FIG. 4

| LBA | Index of Hash Leader | Pointer to Leader | Compression flag |
|---|---|---|---|
| 100 | 17 | 0 | 1 |
| 101 | 17 | 1 | 1 |
| 102 | 17 | 2 | 1 |
| 103 | 17 | 3 | 1 |
| 104 | 17 | 4 | 1 |
| 110 | 23 | 0 | 0 |

LBA1=100   LBA2=101   LBA3=102   LBA4=103   LBA5=104

| CDATA1 | CDATA2 | CDATA3 | CDATA4 | CDATA5 part 1 |

LBA5=104   LBA6=105

| CDATA5 part 2 | CDATA6 |

| LBA | Index of Hash Leader | Pointer to Leader | Compression flag | Split Flag |
|---|---|---|---|---|
| 100 | 17 | 0 | 1 | 0 |
| 101 | 17 | 1 | 1 | 0 |
| 102 | 17 | 2 | 1 | 0 |
| 103 | 17 | 3 | 1 | 0 |
| 104 | 17 | 4 | 1 | 1 |
| 105 | 23 | 0 | 1 | 0 |

FIG. 9

NONVOLATILE MEMORY DEVICES AND METHODS OF CONTROLLING THE SAME

BACKGROUND

1. Technical Field

Exemplary embodiments of the present inventive concept relate generally to nonvolatile memory devices, and more specifically to storage of data in the nonvolatile memory devices using data compression.

2. Discussion of Related Art

A nonvolatile memory device retains its stored data even when its power supply is interrupted. Examples of a nonvolatile memory device include a read only memory (ROM), a programmable ROM (PROM), an electrically programmable ROM (EPROM), an electrically erasable programmable ROM (EEPROM), a flash memory device, a phase-change RAM (PRAM), a magnetic RAM (MRAM), a resistive RAM (RRAM), a ferroelectric RAM (FRAM), etc.

A solid state drive (SSD) is a solid-state storage device that used integrated circuit assemblies as memory to store data persistently. An SSD may include a nonvolatile memory store data. However, since the SSD can only store one logical sector in each physical sector of the nonvolatile memory, the capacity of the SSD is limited.

SUMMARY

According to an exemplary embodiment of the inventive concept, a memory system is provided that includes a nonvolatile memory device having a plurality of physical sectors, a mapping table, and a memory controller including a plurality of hash functions. The memory controller is configured to access the physical sectors using the mapping table and the hash functions. The memory controller is configured to receive a sequence of logical block addresses (LBAs) from a host and logical sector data for each of the LBAs, generate a first virtual address by operating a selected hash function among the hash functions on a first logical block address (LBA) among the sequence, compress the logical sector data to generate compressed data, and store the compressed data in a first physical sector among the physical sectors that is associated with the first virtual address.

According to an exemplary embodiment, a method of writing data to a memory system is provided. The method includes: receiving, by a memory controller, a sequence of logical block addresses (LBAs) and logical sector data for each of the LBAs, from a host; compressing, by the memory controller, the logical sector data; executing, by the memory controller, a selected hash function among a plurality of hash functions on a first LBA among the LBAs to generate a virtual address; and storing, the compressed data in a first physical sector of a nonvolatile memory associated with the virtual address.

According to an exemplary embodiment of the inventive concept, a method of reading data from a memory system is provided. The method includes: receiving, by a memory controller, a logical block address (LBA) from a host; accessing, by the memory controller, an entry of a mapping table associated with the LBA to retrieve an index and a pointer; generating, by the memory controller, a value by subtracting the pointer from the LBA; executing, by the memory controller, a hash function identified by the index to generate a virtual address; and retrieving data from a physical sector of a nonvolatile memory associated with the virtual address.

BRIEF DESCRIPTION OF THE DRAWINGS

The present inventive concept will become more apparent by describing in detail exemplary embodiments thereof with reference to the attached drawings, in which:

FIG. 4 illustrates an example of a mapping table that may be used in the system according to an exemplary embodiment of the inventive concept;

FIG. 8 illustrates an example of a mapping table that may be used in the system according to an exemplary embodiment of the inventive concept;

FIG. 9 illustrates an example of data being split across multiple physical sectors according to an exemplary embodiment of the inventive concept.

DETAILED DESCRIPTION

Figure 1:
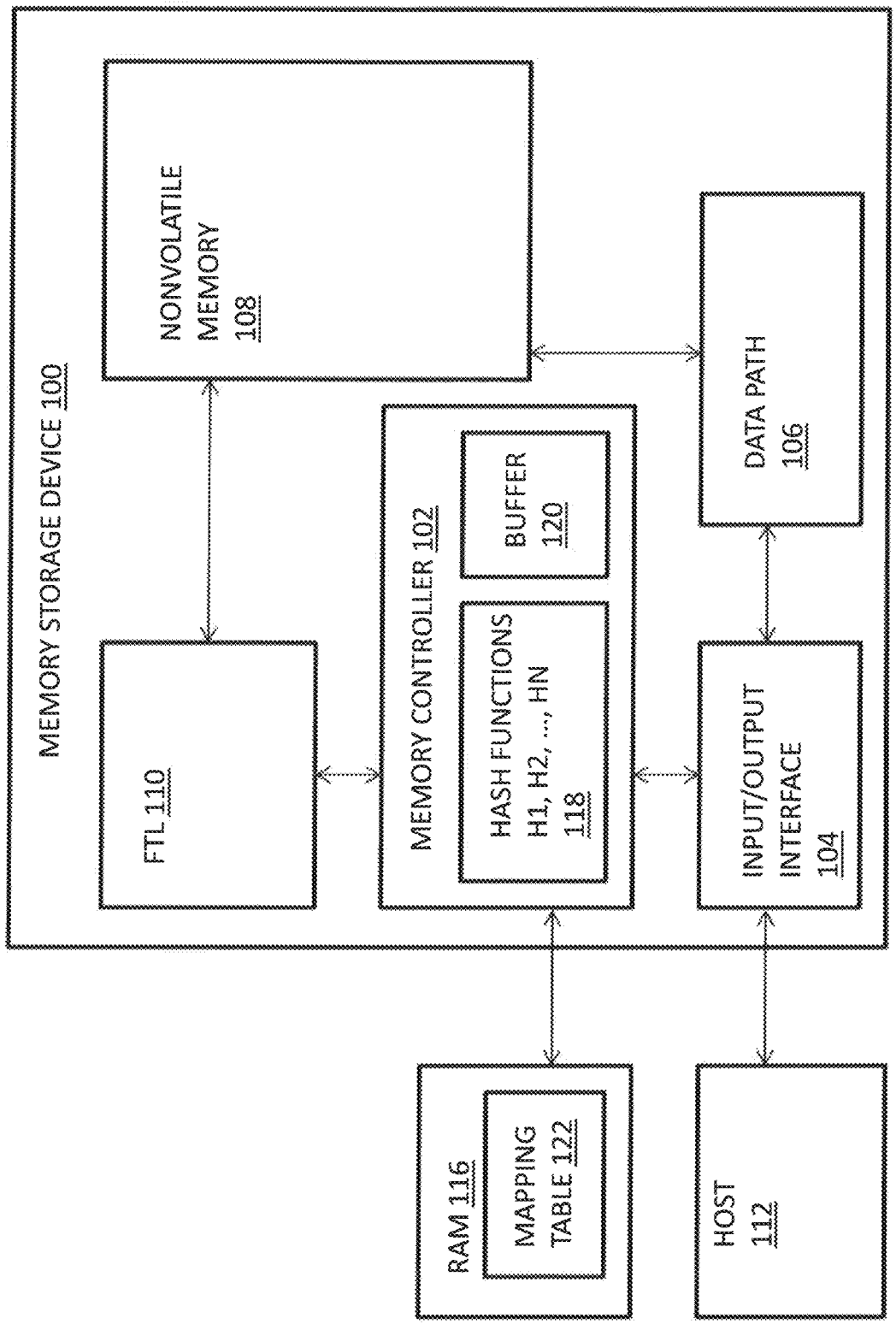
FIG. 1 illustrates a memory system according to an exemplary embodiment of the inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

The embodiments disclosed here provide a method of organizing an address mapping table of a nonvolatile memory storage device using indexes of hash functions (e.g., pseudo-random functions) that return virtual addresses when operated on logical addresses.

FIG. 1 illustrates a memory system according to an exemplary embodiment of the inventive concept. The memory system includes a memory storage device 100, a RAM 116, and a host 112. The memory storage device and the RAM 116 may be implemented within an SDD.

The memory storage device 100 includes a memory controller 102 (e.g., a solid state device (SSD) controller), an input/output (I/O) interface 104, a data path 106, a non-volatile memory 108. When the non-volatile memory is a NAND type or NOR type flash memory, the memory storage device 100 may further include a Flash Transition Layer (FTL) 110 (e.g., software based). The host 112 communicates with the memory storage device 100 using the input/output interface 104. When the non-volatile memory is a flash memory, the flash memory includes a plurality of flash arrays for storing data.

When the non-volatile memory 108 is a flash memory, the memory controller 102 communicates with the FTL 110 for communication with the flash memory 108. The FTL 110 presents the flash pages in the form of LBA arrays to the host 112. For example, the FTL 110 can be a driver that works in conjunction with an existing operating system (or, in some embedded applications, as the operating system) to make linear flash memory appear to the system like a disk drive.

The flash arrays can be combined to form blocks, with each block including a plurality of pages. Examples of commonly used flash page sizes can include, but are not limited to 2 kilobytes (2 KB), 4 KB, 8 KB, 16 KB, and the like. The nonvolatile memory 108 has a fixed number of blocks and each block includes a maximum number N of pages (e.g., e.g., N could equal 32, 64, 128, 256, etc.). The memory controller 102 maintains an address mapping table 122 using the FTL 110. The address mapping table 122 allows the memory controller 102 to translate the Logical Block Addresses (LBAs) from the host 112 into physical page addresses (PPAs) in the physical flash memory 108. While the mapping table 122 is shown in FIG. 1 being located within RAM 116, in an alternate embodiment, the mapping table 112 is located within the memory controller 102 or within the FTL 110.

The data on each physical page (or sector) includes a corresponding entry in the address mapping table 122. The number of entries is based on the entry size and the page size. For example, if each entry in the address mapping table 122 takes 4 bytes and the page size is 8 KB, then 2048 entries can be stored in the page size. The pages storing data about the entries in the address mapping table 122 may be referred to as "meta pages". The address mapping table 122 may be stored in a random-access memory (RAM) 116 for speed of access. In an embodiment, when the memory storage device 100 powers up, the address mapping table 122 is read from the last saved version and reconstructed into the RAM 116. In an exemplary embodiment, part of the entries of the address mapping table 122 are maintained in an on-flash static random-access memory (SRAM)-based cache within the memory storage device 100 and the remaining entries are maintained in the meta pages. The data path 106 is used for communicating the input/output operation between the flash memory 108 and the host 112. The data path 106 includes circuitry which allows switching between an input path and an output path based on the input/output operation.

The memory controller 102 controls read and write operations and may be implemented by a central processing unit (CPU) or a microprocessor. The memory controller 102 stores data in the nonvolatile memory 108 when performing a write operation requested by the host 112 and outputs data stored in the nonvolatile memory 108 when performing a read operation requested by the host 112.

In an embodiment, the nonvolatile memory 108 includes a three-dimensional (3D) memory array. The 3D memory array may be monolithically formed in one or more physical level(s) of a memory cell array having an active area arranged on a circuit related on a silicon substrate and an operation of memory cells. The circuit related to an operation of memory cells may be located in a substrate or on a substrate. The term "monolithic" means that layers of each level of the array are directly deposited on the layers of each underlying level of the array.

In an embodiment of the inventive concept, the 3-dimensional memory array has a vertical-directional characteristic, and may include vertical NAND strings in which at least one memory cell is located on another memory cell. The at least one memory cell may comprise a charge trap layer. Each vertical NAND string may include at least one select transistor located over memory cells. The at least one select transistor having the same structure with the memory cells and being formed monolithically together with the memory cells.

The following patent documents, which are hereby incorporated by reference, describe suitable configurations for three-dimensional memory arrays, in which the three-dimensional memory array may be configured as a plurality of levels, with word lines and/or bit lines shared between levels: U.S. Pat. Nos. 7,679,133; 8,553,466; 8,654,587; 8,559,235; and US Pat. Pub. No. 2011/0233648.

When the host 112 desires to write a given page or sector (e.g., a 8 KB page/sector, a 16 KB page/sector, etc.) corresponding to a given logical block address (LBA), the memory, controller 102 decides on a block (e.g., an empty block) among a plurality of memory blocks of the memory 108 and a page (or sector) among a plurality of pages in the block in which to write the given page.

Figure 2:
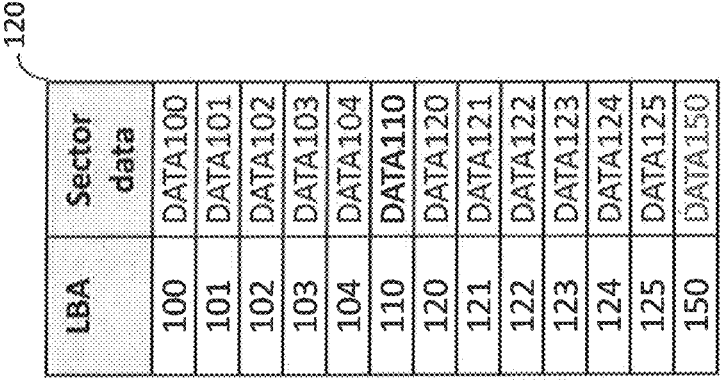
FIG. 2 illustrates a buffer of the system.

In an exemplary embodiment of the inventive concept, the memory controller 102 is configured to receive a write command, several logical block addresses, logical sector data for each of the logical block addresses, and temporarily store the logical block addresses and their corresponding logical sector data in a buffer 120, which may be located within the memory controller 102. In an alternate embodiment, the buffer 120 is located within RAM 116. FIG. 2 illustrates an example of the buffer 120 temporally storing the logical block addresses and their corresponding logical sector data. The logical sector data for a given LBA is sized to fit without compression into a single physical sector or page of the memory 108.

The memory controller 102 includes N hash functions H1, H2, . . . , HN 118, which are configured to generate a pseudo-random number when operated on an LBA, where N is greater than 1. In an alternate embodiment, the hash functions 118 are located in RAM 116 or the FTL 110. In the examples discussed below, N is set to 32, but the inventive concept is not limited thereto. The pseudorandom number corresponds to a virtual address, which includes a physical address of a sector within the memory. For example, when N is 32, the 32 hash functions are capable of generating 32 unique virtual addresses from a single LBA. An individual hash function always generates the same value from a given LBA. For example, if the first hash function H1 is first operated on a current LBA of 100 to return a virtual address of 0x00f7, the next time the first hash function H1 is operated on the LBA of 100, it also returns a virtual address of 0x00f7. The remaining hash functions when operated on the same LBA will generate virtual addresses different from one another and different from the first hash function H1. While the virtual addresses generated from a prior LBA different from the current LBA using the same hash functions 118 could all be different from the virtual addresses generated from the current LBA, it is possible that one or more of the virtual addresses generated from the prior LBA are the same as one or more of the virtual addresses generated from the current LBA.

The range of each individual hash function may be the same as the range of the virtual addresses. For example, if there are $2^{40}$ virtual addresses, then the range of the first hash function H1 is $2^{40}$ and the range of the second hash function HF2 is $2^{40}$. However, each hash function maps to the virtual addresses in a different order. For example, the first hash function HF1 may be mapped to the virtual addresses in a first order and the second hash function may be arranged in a second order that is different from the first order. The range of the virtual addresses may be the same as the range of physical addresses not including those physical addresses used for overprovisioning. For example, 7% of the physical addresses could be dedicated to overprovisioning.

Figure 3:
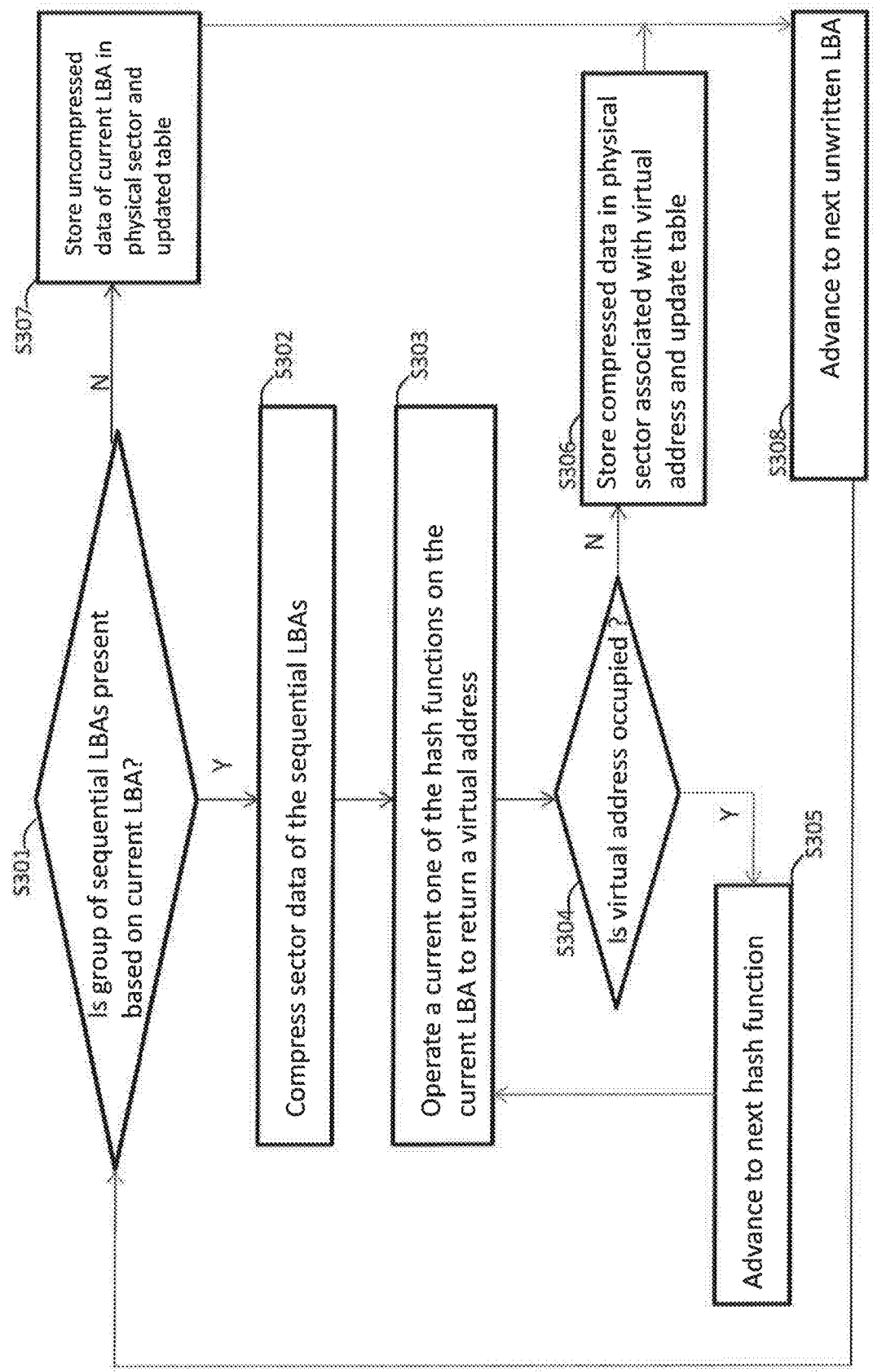
FIG. 3 illustrates a method of writing data to the memory system according to an exemplary embodiment of the inventive concept.

FIG. 3 illustrates a method according to an exemplary embodiment of the inventive concept that may be performed on the LBAs and sector data of the buffer 120 to write the sector data into the memory 108 and create/update the mapping table 122. The method includes analyzing a current one of the LBAs received and the buffer to determine if a group of sequential LBAs is present (S301). If the analyzing determines that a group of sequential LBAs is present, the method compresses the sector data of the group (e.g., data for several sectors) to generate a compressed result that is capable of fitting within a single sector (S302). In an embodiment, the compression is performed using a lossless compression algorithm. For example, if the current LBA is 100, then the analyzing would determine that a group of sequential LBAs including LBAs 100-104 (i.e., 5 LBAs) is present, and compress the corresponding data DATA100-DATA104 of a total of 5 sectors into a single sector of data.

After compressing the data, the method includes operating a current one of the hash functions on the current LBA to return a virtual address (S303). For example, if there are 32 hash functions 118, the current hash function could be the first hash function HF1.

After determining the virtual address, the method includes determining whether the virtual address is occupied (S304). For example, it is possible that a prior write has already written data to a physical address associated with the determined virtual address. The memory storage device 100 may include a validity bitmap having one bit for every virtual address that indicates whether the corresponding virtual address is occupied. For example, when a write to a physical address associated with a virtual address occurs, the memory controller 102 can set the bit of the validity bitmap associated with the virtual address. For example, when a delete of the physical address occurs, the memory controller 102 can clear the bit.

If the virtual address is determined to be occupied, then the method advances to the next hash function (S305) and operates the next hash function on the current LBA. For example, if the virtual address returned by the first hash function HF1 is determined to be occupied, then the method would next operate the second hash function HF2 on the current LBA. If the virtual address is not occupied, the method stores the compressed data in a physical sector of the memory associated with the virtual address and updates a mapping table (S306). For example, if there is first logical data D100, second logical data D101, third logical data D102, fourth logical data D103, and fifth logical data D104 associated with LBAs 100-104, the first-fifth logical data D100-D104 are compressed together to generate compressed data having a size equal to or less than a single physical sector.

If the group of sequential LBAs is not present based on the current LBA, then the uncompressed data of the current LBA is stored in a physical sector and the mapping table is updated (S307). The physical sector may be stored in a physical sector associated with a virtual address created from one of the hash functions 118. For example, if the current LBA is 110, since no other LBAs sequential to 110 are present in the buffer 120, the data DATA110 associated with an LBA of 110 is not compressed and stored in a physical sector of the memory 108 associated with the virtual address.

After the storage of the uncompressed or compressed data, the method advances to a next unwritten LBA (S308). For example, if the current LBA is 100, since an LBA of 100 results in storage of data associated with LBAs 100-104, then the method would advance to an LBA of 110. For example, if the current LBA is 110, since an LBA of 110 results in storage of data associated with an LBA of 110, the method would advance to an LBA of 120. After advancing to the next unwritten LBA, the method resumes to step S301 and treats the next unwritten LBA as the current LBA.

As discussed above, the step S306 of storing the compressed data results in update of a mapping table 122. FIG. 4 illustrates an example of the mapping table 122, which enables the data stored in the memory to be read. The mapping table 122 illustrates only the entries that are updated as a result of operating on an LBA of 100, which causes storage of logical sectors associated with LBAs of 100-104 into a single physical sector. As shown in FIG. 4, each entry of the mapping table 122 indicates a given LBA, an index of a hash leader, and a pointer to the leader. While the mapping table 122 is illustrated as including a separate column including the LBAs, this column can be omitted. For example, the LBA of an entry can be inferred from the position of the entry within the mapping table 122.

The index of the hash leader uniquely identifies one of the available hash functions HF1-HFN that is used on the leader LBA to return a virtual address that stores data associated with several LBAs. So when the LBA of 100 was operated on according to the above-described method, the virtual addresses returned by the first 16 hash functions were all occupied and the virtual address returned by the $17^{th}$ hash function HF17 was the first un-occupied virtual address. In this example, since logical sector data associated with five LBAs of 100-104 were stored into a single physical sector associated with a virtual address returned by operating the $17^{th}$ hash HF17 on an LBA of 100, the index of the hash leader for the entries having LBAs 100-104 are all set to 17 in mapping table 122. The LBA of 100 is considered the leader with respect to LBAs 100-104 since operating the $17^{th}$ hash function HF17 on an LBA 100 will return a virtual address storing data associated with LBAs of 100-104. Since the LBA of 100 is the leader, its pointer to leader field provides an offset of 0. Since the LBA of 101 is offset from the leader LBA of 100 by 1, its pointer to leader field in the mapping table 122 is 1, since the LBA of 102 is offset from the leader LBA of 100 by 2, its pointer to leader field in the mapping table is 2, etc.

While the above describes receipt of five sequential LBAs and their compression of their data to fit within a single physical sector, the inventive concept is not limited to five LBAs. For example, less than five or more than five sequential LBAs may be received and compressed to fit within a single physical sector.

Figure 5:
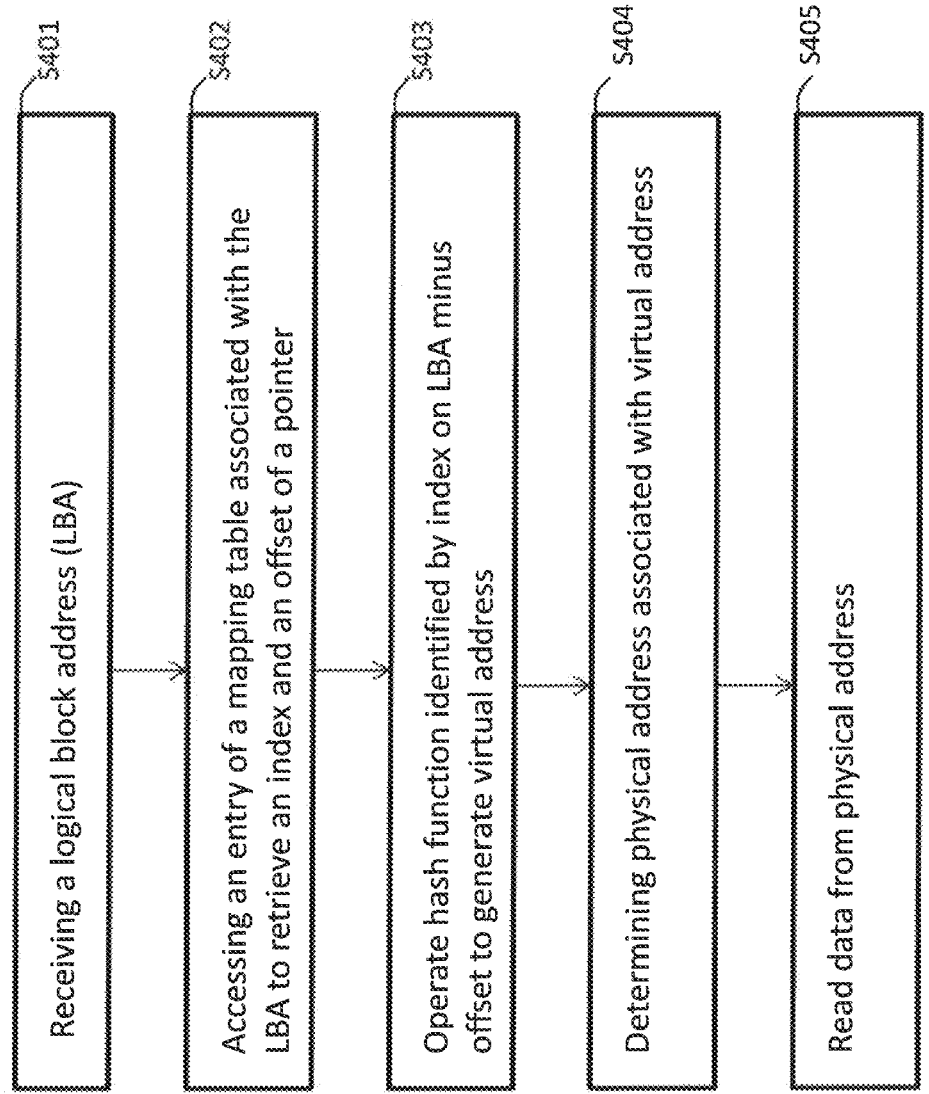
FIG. 5 illustrates a method of reading data from the system according to an exemplary embodiment of the inventive concept.

FIG. 5 illustrates a method (e.g., performed by controller 102) of reading data from the memory device according to an exemplary embodiment of the inventive concept. The method includes receiving a logical block address (LBA) (S401). The LBA may be received from the host 112 along with a read request or a read command.

The method further includes accessing an entry of the mapping table associated with the logical black address (LBA) to retrieve an index and an offset of a pointer (S402). For example, as shown in FIG. 4, if the LBA is 100, the index is 17 and the offset is 0, and if the LBA is 101, the index is also 17 and the offset is 101.

The method further includes operating the hash function identified by the index on the LBA minus the offset to generate a virtual address (S403). For example, if the LBA is 100, 0 is subtracted from 100 and the hash function is operated on 100, and if the LBA is 101, 1 is subtracted from 101, and again the hash function is operated on 100.

The method further includes determining a physical address associated with the virtual address (S404) and reading data from the physical address (S405). Further, since the data is compressed, the controller 102 may need to uncompress the data before sending it to the host 112.

Figure 6:
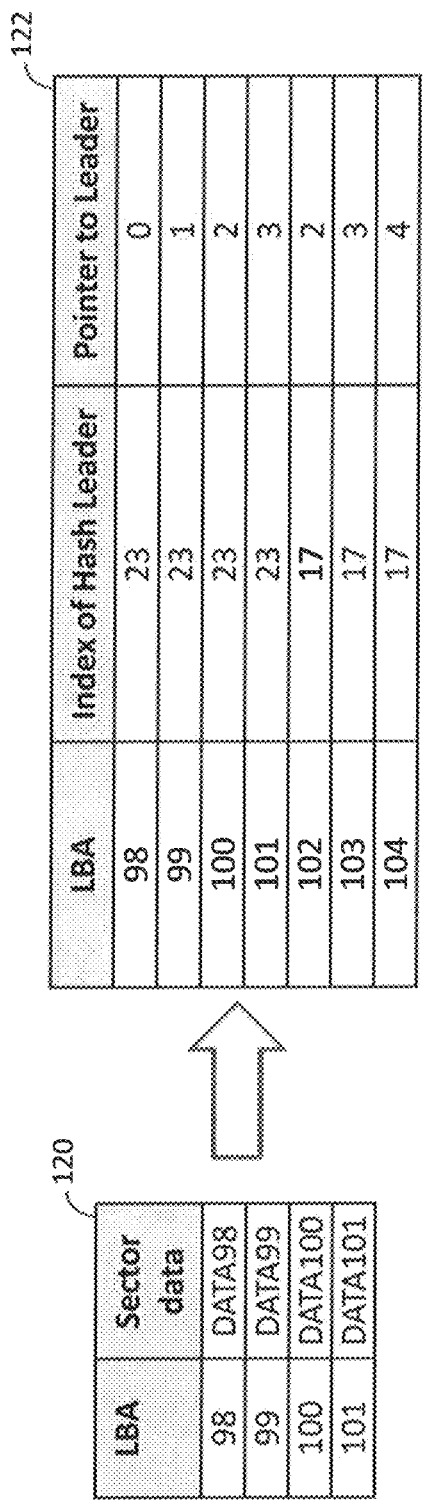
FIG. 6 illustrates an example of data being updated in the system.

The mapping of the mapping table 122 is resilient to updates. FIG. 6 illustrates an example of a new write being performed based on received LBAs 98, 98, 100, and 101. Since data associated with LBAs 100 and 101 were already written to a sector in physical memory 108, this new write includes an update to this data. However since data in a current sector/page of a flash memory cannot be overwritten until after the entire block is erased, the updated data is stored in a new sector/page. Since the updated LBAs 100 and 101 are part of a new sequence including LBAs 98-101, and the LBA of 98 is the first LBA of the new sequence, the LBA of 98 is the new leader. In this example, it was determined that a hash function HF23 was the first of the hash functions 118 to return an un-occupied virtual address based on an LBA of 98. Thus, the index field of the entries of the updated mapping table 122 associated with LBAs 98-101 are updated to 23. Since the LBA of 98 is the leader, its pointer to leader field has an offset of 0 to point to itself. Since the LBA of 99 is offset by 1 from the leader LBA of 98, its pointer to leader field is set to 1 to point to the prior entry. While the pointer to leader field of the entry of the LBA of 100 in the mapping table 122 of FIG. 4 was previously set to 0, it now becomes set to 2 since it is offset from the new leader LBA of 98 by 2. While the offset of the entry of the LBA of 101 in the mapping table 122 of FIG. 4 was previously set to 1, it now becomes set to 3 since it is offset from the new leader LBA of 98 by 3. The entries associated with LBAs 102-104 remain unchanged. Even though their leader LBA (i.e., 100) is now gone, their data can still be accessed using the same method. For example, a read to an LBA of 102 will retrieve an index of 17 and pointer to leader indicating an offset of 2. Thus, the virtual address can be generated as before by subtracting the offset of 2 from the LBA of 102 and operating HF17 on a result of 100.

If all the virtual addresses returned by the hash functions 118 when operated on a given leader LBA are determined to be occupied, a conflict has occurred. The controller 102 may resolve the conflict using a method similar to a cuckoo hash. In an embodiment, the LBAs associated with the occupied virtual addresses are determined, and one or more of the LBAs is assigned to a different unoccupied virtual address to resolve the conflict. If the different unoccupied virtual address can be found, then an instruction or request can be sent to the controller 102 to read its corresponding sector and write it to a new location, with the new assigned virtual address. A linear hash can be used to trace back which LBAs occupy which virtual addresses.

As discussed above, during step S306, the data associated with several LBAs are compressed so they can be stored within a single physical sector. For example, if a sequence of LBAs of 100-104 is received, and the corresponding data is compressed so it can fit within a single physical sector, and the host 112 desires to only read the data associated with an LBA of 102, the controller 102 needs information to be able to distinguish the compressed data associated with the LBA of 102 from the compressed data of the other logical block addresses. This information may include offsets of each piece of data (e.g., logical sector data) associated with a different LBA and the length or size of each piece of data. While this information could be stored in the RAM 116, in an exemplary embodiment of the inventive concept, this information is stored in a spare (empty) area of a physical sector that remains after the compressed data.

Figure 7:
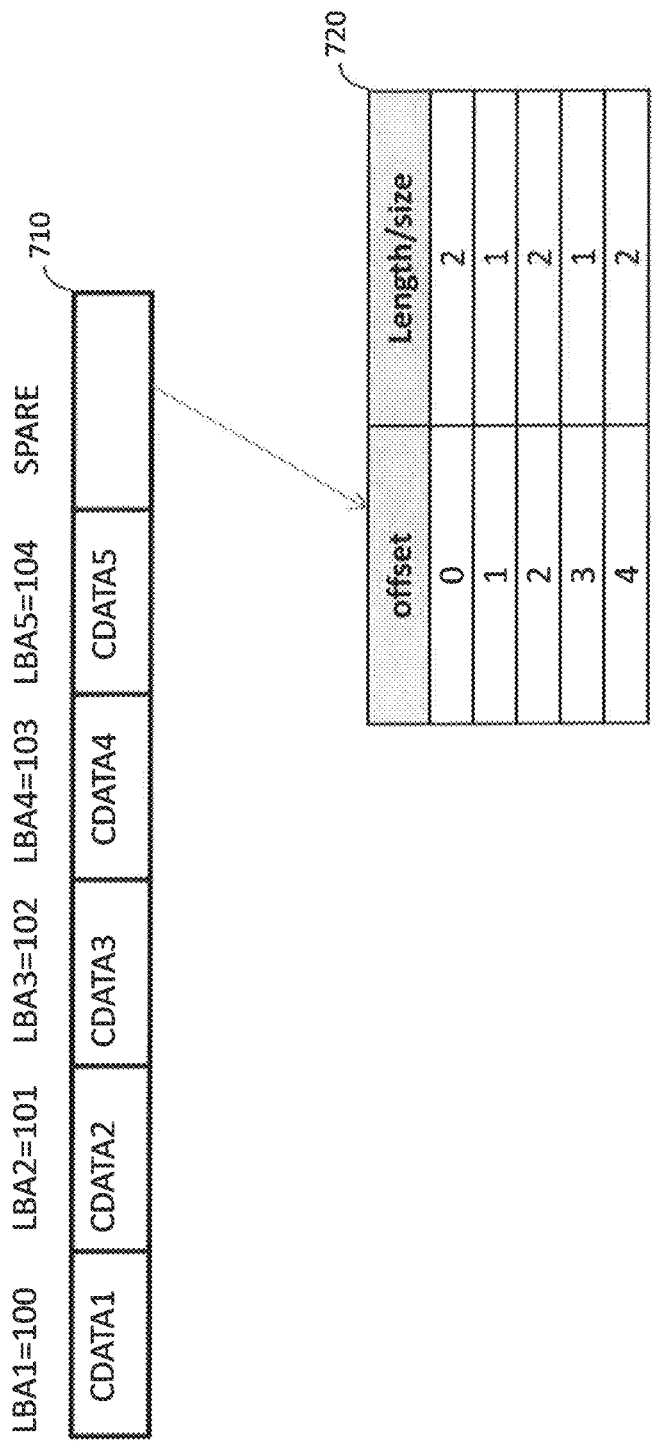
FIG. 7 illustrates an example of storage of information used to distinguish and logical sectors from a physical sector according to an exemplary embodiment of the inventive concept.

FIG. 7 illustrates a single physical sector 710 in which the compressed data (e.g., CDATA1-CDATA5) associated with LBAs 100-104 is stored, and a spare region 710 not filled by the compressed data, which stores an information table 720 including an offset and a length or size. In an embodiment, the offsets correspond to the last 3 bits of the LBAs, and the lengths are a number of 512 byte segments. For example, if the length is 1 for a given LBA, then the data associated with the given LBA is 512 bytes long, if the length is 2 for a given LBA, then the data associated with the given LBA is 2*512 bytes or 1024 bytes. For example, if the host 112 desires to read the data associated with an LBA of 101, the controller 102 can compare the offsets (e.g., perform an XOR on the offsets) in entries of the spare region 710 against the last three bits of 101 to determine that the second entry in the information table 720 corresponds to the LBA of 101, and its length of 1 means that the second compressed data associated with the LBA of 101 is 512 bytes long. Since there is 1 entry in the information table 720 before the second entry having a length of 2, then the controller 102 can advance 1024 bytes and extract 512 bytes to retrieve the compressed data CDATA2 corresponding to the LBA of 101. Once the compressed data is retrieved, it can be uncompressed by the controller 102 to generate uncompressed data, which can then be sent to the host 112.

In an embodiment, a step of checking whether the sector data of the sequential LBAs is compressible is performed between steps S301 and S302. If it is determined that the data is not compressible, then the sector data is stored without compression in respective physical sectors. In an embodiment, the memory 108 includes a first area for storing data and a second area for storing metadata. In an embodiment, 1 bit of data is stored in the metadata for each physical sector indicating whether it holds compressed data or not. In another embodiment, this 1 bit information is stored in the mapping table 122 in RAM 116 along with an index of the hashing function and the pointer (offset) to the leader. For example, the 1 bit information may be stored in the mapping table 122 when there is not enough room in the metadata area.

FIG. 8 illustrates an example of the mapping table 122' that includes the 1 bit information (e.g., a compression flag) indicating whether or not data associated with a given LBA is compressed or not. For example, when the compression flag is set (e.g., 1), it indicates that the data is compressed and when the compression flag is cleared (e.g., 0), it indicates that the data is not compressed.

In FIG. 3 it is assumed that the data of the sequential LBAs, when compressed are capable of fitting within a single physical sector. However, when too many sequential LBAs are received, even when the data is compressed, the result may be too large to fit within a single physical sector and require a second physical sector. Further, when the compressed data is stored in two physical sectors, data of one logical sector may be split across two physical sectors.

FIG. 9 shows an example where the compressed data CDATA5 for an LBA of 104 is split across two sectors. In an exemplary embodiment of the inventive concept, the case where data is too large to fit within a single physical sector is handled by always writing the second part of the split logical sector data together with logical sector data of a sequentially next one of the received LBAs, to the second physical sector. The LBA of the sequentially next LBA will be considered the leader of the second physical sector for hash generation.

The mapping table 122' of FIG. 8 is revised further as shown in FIG. 9 to generate a new mapping table 122'', which further includes a column containing split information. The column contains 1 bit information (e.g., a split flag) indicating whether the logical sector data for a single LBA is split across two physical sectors. For example, if the logical sector data is split across two sectors like the LBA of 104, its split flag is set to 1, and if the logical sector data is not split across two sectors like the LBA of 105, its split flag is set to 0.

If the controller 102 receives a read request from the host 112 for the LBA of 104, it will read the first part of the fifth compressed data CDATA5 in the same manner described above by retrieving a first virtual address based on the $17^{th}$ hash function HF17. However, the controller 102 will further retrieve the split flag indicating that the second part of the data is located in another physical sector. The controller 102 will then advance to the next entry within the mapping table 122'' to determine its index and offset (e.g., pointer to leader), use the retrieved index to identify a new hash function (e.g., HF23) and operate the new hash function on the LBA of the next entry (e.g., 105) to retrieve a second virtual address. The second part of the fifth compressed data CDATA5 associated with the received LBA (e.g., 104) is located in the physical sector associated with the second virtual address. The controller 102 can distinguish the second part of the data CDATA5 for the LBA of 104 from the CDATA6 associated with the LBA of 105 using the information table 720 stored in a spare region of the second sector as an example.

Figure 10:
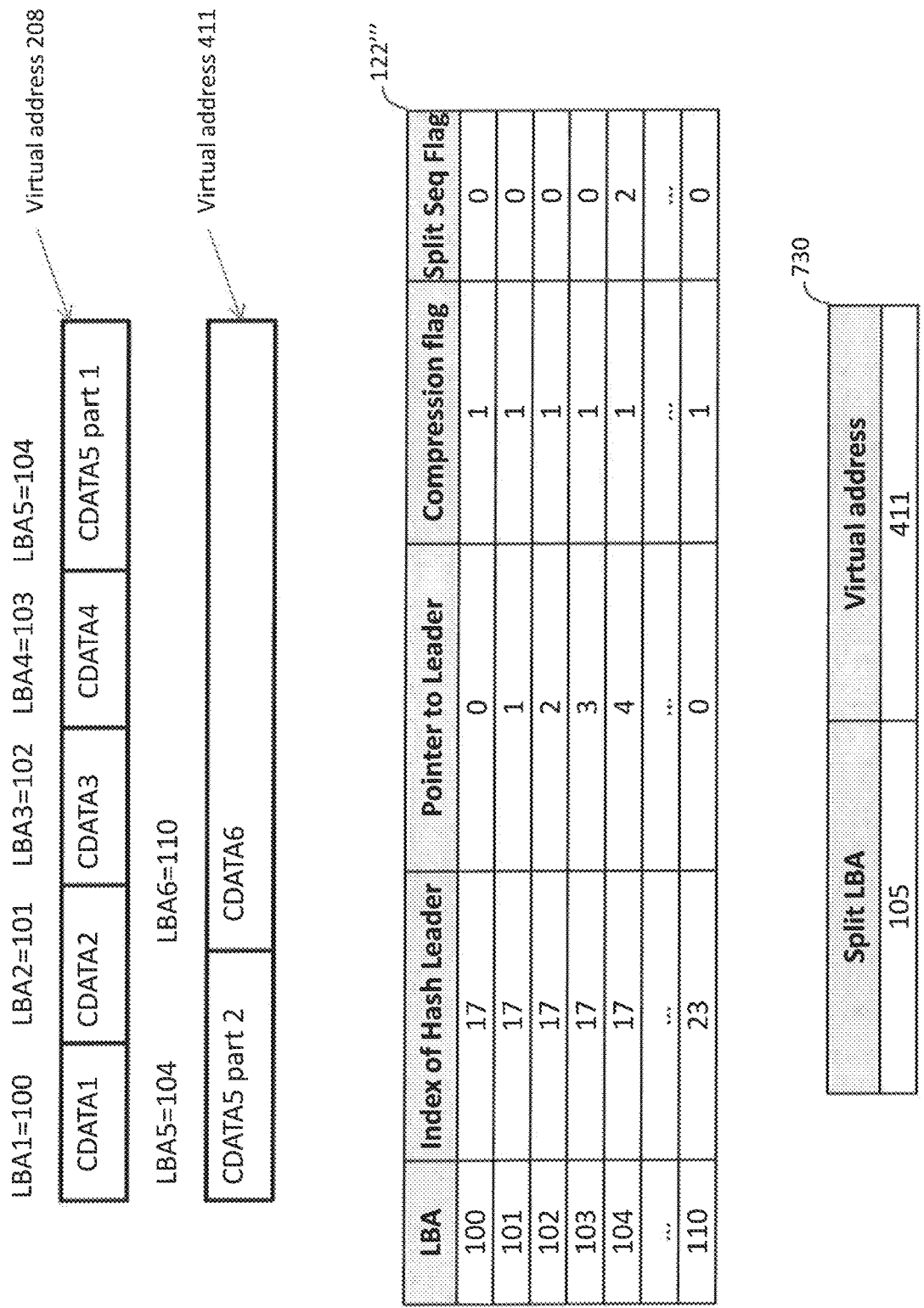
FIG. 10 illustrates another example of data being split across multiple physical sectors according to an exemplary embodiment of the inventive concept.

In an exemplary embodiment, logical sector data associated with a first LBA is split across two physical sectors using a second LBA that is not sequential to the first LBA, as shown in the mapping table 122''' of FIG. 10. For example, as shown in FIG. 10, the first part of the logical sector data of the LBA of 104 is stored in a first physical sector associated with a first virtual address of 208, and the second part of the logical sector data is stored in a second physical sector associated with a second virtual address of 411. If a read request for an LBA of 104 is received, the mapping table 122''' is accessed to retrieve the first part of the data CDAT5. The split flag in the mapping table 122'' of FIG. 9 has been replaced with a split sequence flag (e.g., split seq flag) indicating whether the data is not split (e.g., split seq flag=0), is split sequentially (e.g., split seq flag=1), or is not split sequentially (e.g., split seq flag=2). The controller 102 upon accessing the entry associated with the LBA of 104 would determine from the split seq flag that the second part is split into a virtual address of an LBA that is not sequential to an LBA of 104. Then, the controller 102 accesses a split table 730 via the LBA of the read request (e.g., 104) to return a second virtual address (e.g., 411) of the second physical sector. The second data of the LBA of 104 can then be retrieved from the physical sector associated with the second virtual address. The split table 730 may be stored in RAM 116.

In an embodiment of the inventive concept, virtual addresses are not assigned according to a consecutive order since they are determined by the hash functions 118. In this embodiment, when the memory storage device 100 is part of a redundant array of inexpensive disks (RAID), upon assignment of each virtual address, a corresponding stripe of the RAID is updated. For example, if virtual addresses 200, 201, 202, 203, 204, and 205 for data are associated with virtual addresses 206 and 207 for parity, when virtual address 202 becomes assigned, the virtual addresses 206 and 207 need to be updated.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

Although the present inventive concept has been described in connection with exemplary embodiments thereof, those skilled in the art will appreciate that various modifications can be made to these embodiments without substantially departing from the principles of the present inventive concept.

What is claimed is:

1. A method of writing data to a memory system comprising:
   receiving, by a memory controller, a sequence of N consecutive logical block addresses (LBAs) and logical sector data for each of the LBAs, from a host;
   compressing, by the memory controller, the logical sector data;
   executing, by the memory controller, a first one of a plurality of hash functions on a first LBA among the sequence to generate a first virtual address;
   determining, by the memory controller, whether the first virtual address is occupied;
   setting a destination address to the first virtual address when it is determined that the virtual address is not occupied;
   setting the destination address to a second other virtual address generated from executing a second other one of the hash functions on the first LBA when it is determined that the first virtual address is occupied;
   storing, the compressed data in a first physical sector of a nonvolatile memory associated with the destination address;
   updating, by the memory controller, a mapping table to include to include a $1^{st}$ entry corresponding to the first LBA and an index of the hash function that generated the destination address, and $2^{nd}$ though Nth consecutive entries respectively corresponding to the $2^{nd}$ through Nth LBAs each including the index and an offset to the $1^{st}$ entry, and
   where N is at least two.

2. The method of claim 1, wherein each hash function is configured to generate a different pseudo-random number when operated on a same LBA.

3. The method of claim 1, further comprising the memory controller storing information in spare region of the first physical sector indicating offsets and lengths of compressed logical sector data for each of the LBAs.

4. The method of claim 1, further comprising the memory controller updating the entries to indicate that logical sector data associated with each of the LBAs has been compressed.

5. A memory system comprising:
a nonvolatile memory device comprising a plurality of physical sectors;
a mapping table; and
a memory controller including a plurality of hash functions, the memory controller configured to access the physical sectors using the mapping table and the hash functions,
wherein the memory controller is configured to receive a sequence of N consecutive logical block addresses (LBAs) from a host and logical sector data for each of the LBAs, compress the logical sector data to generate compressed data, execute a first one of the hash functions on a first logical block address (LBA) among the sequence to generate a first virtual address, determine whether the first virtual address is occupied, set a destination address to the first virtual address when it is determined that the first virtual address is not occupied, set the destination address to a second other virtual address generated from executing a second other one of the hash functions on the first LBA when it is determined that the first virtual address is occupied, and store the compressed data in a first physical sector among the physical sectors that is associated with the destination address,
wherein the memory controller updates the mapping table to include a $1^{st}$ entry corresponding to the first LBA and an index of the hash function that generated the destination address, and $2^{nd}$ though Nth consecutive entries respectively corresponding to the $2^{nd}$ through Nth LBAs each including the index and an offset to the $1^{st}$ entry, and
where N is at least two.

6. The memory system of claim 5, wherein each hash function is configured to generate a different pseudo-random number when operated on a same LBA.

7. The memory system of claim 5, wherein the controller is configured to receive an input LBA and a read command from the host, access an entry of the mapping table associated with the input LBA to retrieve an index and an offset, subtract the retrieved offset from the input LBA to generate a result, operate one of the hash functions identified by the retrieved index on the result to generate a third virtual address, and output data of one of the physical sectors associated with the third virtual address to the host.

8. The memory system of claim 5, wherein the nonvolatile memory is flash memory.

9. The memory system of claim 5, wherein the controller stores information in a spare region of the first physical sector indicating offsets and lengths of compressed logical sector data for each of the LBAs.

10. The memory system of claim 5, wherein the controller is configured to update the entries to indicate that logical sector data associated with each of the LBAs has been compressed.

11. The memory system of claim 5, wherein the controller is configured to receive an input LBA, store logical sector data associated with the input LBA in the memory device without compression in one of the physical sectors when the input LBA is received without at least one additional LBA sequential to the input LBA, and update an entry of the mapping table corresponding to the input LBA to indicate the stored logical sector data is uncompressed.

12. The memory system of claim 5, wherein the controller stores the compressed data in the first physical sector and a second physical sector among the physical sectors.

13. The memory system of claim 12, wherein the compressed data includes compressed data for one logical sector that is split across the first and second physical sectors.

14. The memory system of claim 13, wherein the controller updates the mapping table to indicate that the one logical sector is split.

15. The memory system of claim 5, further comprising a buffer temporarily storing the sequence of logical block addresses (LBAs) and the corresponding logical sector data.

16. A method of reading data from a memory system comprising:
receiving, by a memory controller, a first logical block address (LBA) and a read command from a host;
accessing, by the memory controller, an entry of a mapping table associated with the first LBA to retrieve an index and an offset, in response to receipt of the read command;
generating, by the memory controller, a second LBA by subtracting the offset from the first LBA;
selecting, by the memory controller, a hash function from among a plurality of different hash functions using the index;
executing, by the memory controller, the selected hash function on the second LBA to generate a virtual address; and
retrieving data from a physical sector of a nonvolatile memory associated with the virtual address,
wherein the different hash functions generate a different virtual address when executed on a same value.

17. The method of claim 16, further comprising:
uncompressing, by the memory controller, the retrieved data to generate uncompressed data when the entry indicates a compression has been performed;
sending, by the controller, the uncompressed data associated with the LBA to the host when the entry indicates the compression; and
sending, by the controller, the retrieved data to the host when the entry indicates no compression has been performed.

18. The method of claim 16, wherein the retrieving of the data comprises:
determining, by the memory controller, an offset and a size of the data in the physical sector from a spare region in the physical sector; and
extracting, by the memory controller, data from the physical sector at the offset and having the size.

* * * * *